(12) United States Patent
Kim

(10) Patent No.: US 11,105,093 B2
(45) Date of Patent: Aug. 31, 2021

(54) SUPPORT STRUCTURE FOR SUPPORTING FLOOR PANEL AND ACCESS FLOOR SYSTEM INCLUDING SUPPORT STRUCTURE

(71) Applicant: HAE KWANG CO., LTD., Chungcheongbuk-do (KR)

(72) Inventor: Myunsoo Kim, Gyeonggi-do (KR)

(73) Assignee: HAE KWANG CO., LTD.

( * ) Notice: Subject to any disclaimer, the term of this patent is extended or adjusted under 35 U.S.C. 154(b) by 90 days.

(21) Appl. No.: 16/790,298

(22) Filed: Feb. 13, 2020

(65) Prior Publication Data
US 2021/0164224 A1 Jun. 3, 2021

(30) Foreign Application Priority Data
Dec. 3, 2019 (KR) .................. 10-2019-0159179

(51) Int. Cl.
| | |
|---|---|
| *E04F 15/024* | (2006.01) |
| *E04B 5/14* | (2006.01) |
| *E04B 5/10* | (2006.01) |
| *E04B 5/02* | (2006.01) |
| *F16B 7/18* | (2006.01) |

(52) U.S. Cl.
CPC ............. *E04B 5/14* (2013.01); *E04B 5/023* (2013.01); *E04B 5/10* (2013.01); *E04F 15/02458* (2013.01); *E04F 15/02464* (2013.01); *F16B 7/187* (2013.01); *E04F 15/0247* (2013.01); *E04F 15/02452* (2013.01)

(58) Field of Classification Search
CPC ... E04B 5/14; E04B 5/10; E04B 5/023; F16B 7/187; E04F 15/02458; E04F 15/02464; E04F 15/0247; E04F 15/02452

USPC ............................................................ 52/263
See application file for complete search history.

(56) References Cited

U.S. PATENT DOCUMENTS

| | | | | |
|---|---|---|---|---|
| 5,479,745 A * | 1/1996 | Kawai | ............... | E04F 15/02464 52/126.1 |
| 5,791,096 A * | 8/1998 | Chen | ................ | E04F 15/02458 52/126.6 |
| 6,363,685 B1 * | 4/2002 | Kugler | ............. | E04F 15/02183 52/126.6 |
| 10,047,528 B1 * | 8/2018 | Kim | .................. | E04F 15/02458 |
| 2004/0261329 A1 * | 12/2004 | Kugler | ............. | E04F 15/02183 52/126.6 |
| 2020/0024852 A1 * | 1/2020 | Casprini | ................ | F24D 3/148 |

FOREIGN PATENT DOCUMENTS

| | | | | |
|---|---|---|---|---|
| DE | 202011050950 U1 * | 10/2011 | ........ | E04F 15/02022 |
| EP | 2322739 B1 * | 11/2014 | ........ | E04F 15/02452 |
| WO | WO-2016155691 A2 * | 10/2016 | ........ | E04F 15/02044 |
| WO | WO-2019186573 A1 * | 10/2019 | .......... | E04F 15/0247 |

* cited by examiner

*Primary Examiner* — Adriana Figueroa
(74) *Attorney, Agent, or Firm* — Tarolli, Sundheim, Covell & Tummino LLP

(57) ABSTRACT

Disclosed is a support structure on which a floor panel is seated. The support structure includes a beam element disposed along an axis, a post supporting the beam element, a beam element bracket seated on top of the beam element, a seat pad seated on top of the beam element bracket, and supporting the floor panel, and a seat pad connection member connecting the beam element bracket and the seat pad to each other.

16 Claims, 10 Drawing Sheets

SUPPORT STRUCTURE FOR SUPPORTING FLOOR PANEL AND ACCESS FLOOR SYSTEM INCLUDING SUPPORT STRUCTURE

CROSS REFERENCE TO RELATED APPLICATION

The present application claims priority to Korean Patent Application No. 10-2019-0159179, filed Dec. 3, 2019, the entire contents of which is incorporated herein for all purposes by this reference.

BACKGROUND OF THE INVENTION

Field of the Invention

The present disclosure relates generally to a support structure. More particularly, the present disclosure relates to a support structure for supporting a floor panel in an access floor system, and an access floor system including the support structure.

Description of the Related Art

An access floor system is a system for forming a floor spaced apart from a foundation floor by a predetermined distance. The access floor system includes floor panels disposed spaced apart from the foundation floor by a predetermined distance and a support structure supporting the floor panels from the foundation floor.

The access floor system is used in clean rooms such as semiconductor fabrication labs for fabrication of semiconductors requiring high precision and integration, pharmaceutical labs, genetic engineering labs, and the like. Various equipment or piping can be installed in the space between the floor panels and the foundation floor.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and an objective of the present invention is to provide a support structure including a seat pad capable of stably supporting a floor panel and easily controlling the alignment of the floor panel, and to provide an access floor system including the support structure.

A support structure on which a floor panel is seated according to embodiments of the present disclosure includes: a beam element disposed along an axis; a post supporting the beam element; a beam element bracket seated on top of the beam element; a seat pad seated on top of the beam element bracket, and supporting the floor panel; and a seat pad connection member connecting the beam element bracket and the seat pad to each other.

An access floor system according to embodiments of the present disclosure includes: a floor panel; and a support structure supporting the floor panel, wherein the support structure includes: a beam element disposed along an axis; a post supporting the beam element; a beam element bracket seated on top of the beam element; a seat pad seated on top of the beam element bracket, and supporting the floor panel; and a seat pad connection member connecting the beam element bracket and the seat pad to each other.

The support structure according to the embodiments of the present disclosure has an advantage of stably seating the floor panel onto the support structure using the seat pad.

Due to provision of the seat pad that is movable on a horizontal plane, the support structure according to the embodiments of the present disclosure has an advantage in that the position of the floor panel is controlled even when an error occurs after installation of the floor panel, thus simplifying an installation process.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

Figure 1:
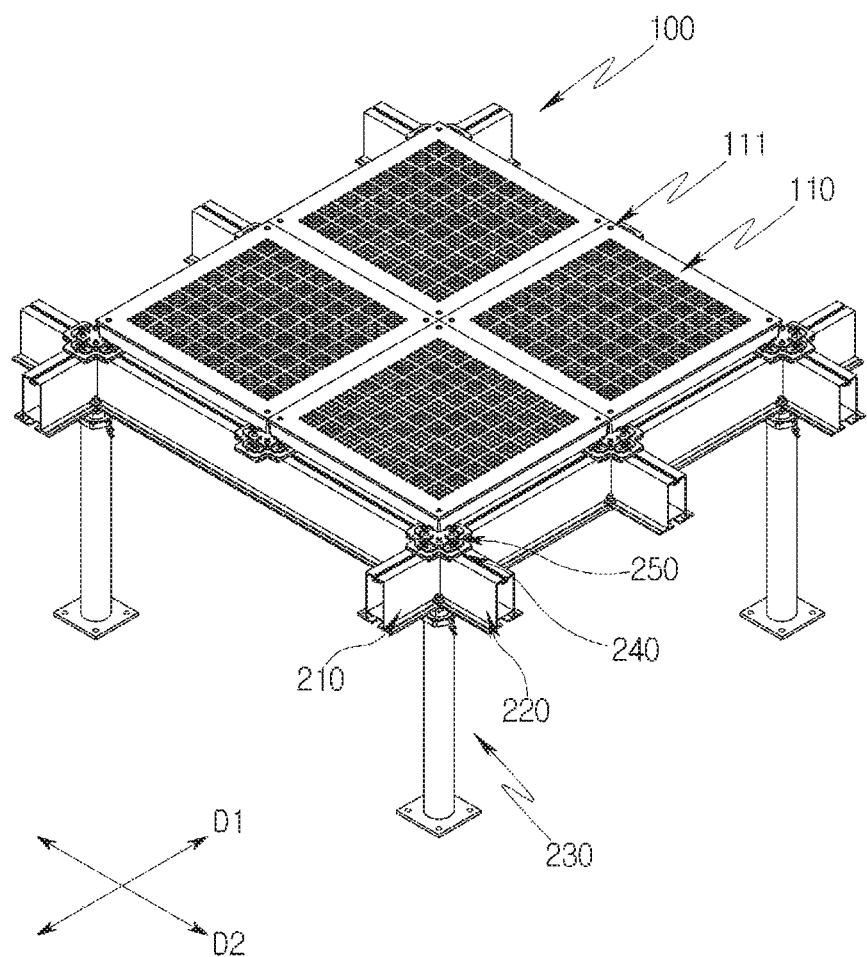
FIG. 1 is a view showing an access floor system according to embodiments of the present disclosure.

Hereinbelow, exemplary embodiments of the present invention will be described in detail with reference to the accompanying drawings. Throughout the drawings, the same reference numerals will refer to the same or like parts.

FIG. 1 is a view showing an access floor system according to embodiments of the present disclosure. Referring to FIG. 1, the access floor system 10 may include a floor panel 100 and a support structure 200. The floor panel 100 may refer to a flooring material used in a clean room or a computer room. The floor panel 100 may be installed at a predetermined distance from a foundation floor by the support structure 200 as will be described later.

In some embodiments, the floor panel 100 may include multiple unit panels 110, and the multiple unit panels 110 may be disposed on the support structure 200 in a grid arrangement to form an access floor.

Each of the multiple unit panels 110 may include a locking hole 111. In some embodiments, locking holes 111 may be formed at positions near respective vertices of the unit panels 110.

The support structure 200 may support the floor panel 100 seated on the support structure 200. The support structure 200 may be installed on the foundation floor to maintain the floor panel 100 spaced apart from the foundation floor by a predetermined distance. For example, the predetermined distance may exceed the length of one side of each of the unit panels 110 of the floor panel 100.

The support structure 200 may include first beam elements 210, second beam elements 220, a post 230, a seat pad 240, and a beam element bracket 250.

The first beam elements 210 and the second beam elements 220 may be coupled to each other in a perpendicular arrangement. In some embodiments, multiple first beam elements 210 may be arranged spaced apart and parallel to each other along a first axis D1, and multiple second beam elements 220 may be arranged spaced apart and parallel to each other along a second axis D2. In the present specification, the longitudinal direction of the first beam elements 210 may be defined as the direction of the first axis D1, and the longitudinal direction of the second beam elements 220 may be defined as the direction of the second axis D2.

The first axis D1 and the second axis D2 may be perpendicular to each other. Herein, an arrangement interval of the first beam elements 210 and an arrangement interval of the second beam elements 220 may correspond to the length (or width) of each of the unit panels 110 of the floor panel 100.

The first beam elements 210 and the second beam elements 220 may have the same height. For example, upper surfaces of the first beam elements 210 and upper surfaces of the second beam elements 220 may be included in the same plane.

The first beam elements 210 and the second beam elements 220 may be manufactured by an aluminum extrusion method. Such a method has an advantage in that there is less limitation on a cross-sectional shape of the first beam elements 210 and the second beam elements 220, and thus the beam elements 210 and 220 are reduced in weight and are easy to manufacture.

In some embodiments, each of the first beam elements 210 and the second beam elements 220 may be formed into a hollow body having a rectangular cross-section, but is not limited thereto. For example, each of the first beam elements 210 and the second beam elements 220 may be formed into shape steel of H, L or like shape in cross-section, shape steel of polygonal shape in cross-section, and the like.

The post 230 may be coupled to the first beam elements 210 and the second beam elements 220 to support the first beam elements 210 and the second beam elements 220. In some embodiments, the post 230 may support the first beam elements 210 and the second beam elements 220 at a location under an intersecting portion of the first beam elements 210 and the second beam elements 220.

The post 230 may be manufactured such that the height thereof corresponds to the design height of the floor panel 100. In some embodiments, the post 230 may include a bolt and a nut such that the length thereof is adjustable. This will be described later.

The seat pad 240 may be seated on the beam element bracket 250 and support the floor panel 100. In some embodiments, the floor panel 100 may be seated and supported on the seat pad 240. For example, when the unit panels 110 of the floor panel 100 are arranged in a grid arrangement, the seat pad 240 may support an intersecting point of the unit panels 110. That is, four unit panels 110 neighboring each other may be seated on one seat pad 240.

The beam element bracket 250 may connect the first beam elements 210 and the second beam elements 220 to each other. In some embodiments, the beam element bracket 250 may be seated on the first beam elements 210 and the second beam elements 220 to connect and fix the first beam elements 210 and the second beam elements 220 to each other. For example, the beam element bracket 250 may be seated on an upper surface of the intersecting portion of the first beam elements 210 and the second beam elements 220.

According to the embodiments of the present disclosure, provision of the beam element bracket 250 has an advantage of reducing deformation between the first beam elements 210 and the second beam elements 220, while improving coupling between the first beam elements 210 and the second beam elements 220.

According to the embodiments of the present disclosure, provision of the seat pad 240 has an advantage of reducing deformation between the first beam elements 210 and the second beam elements 220, while improving coupling between the first beam elements 210 and the second beam elements 220.

Figure 2:
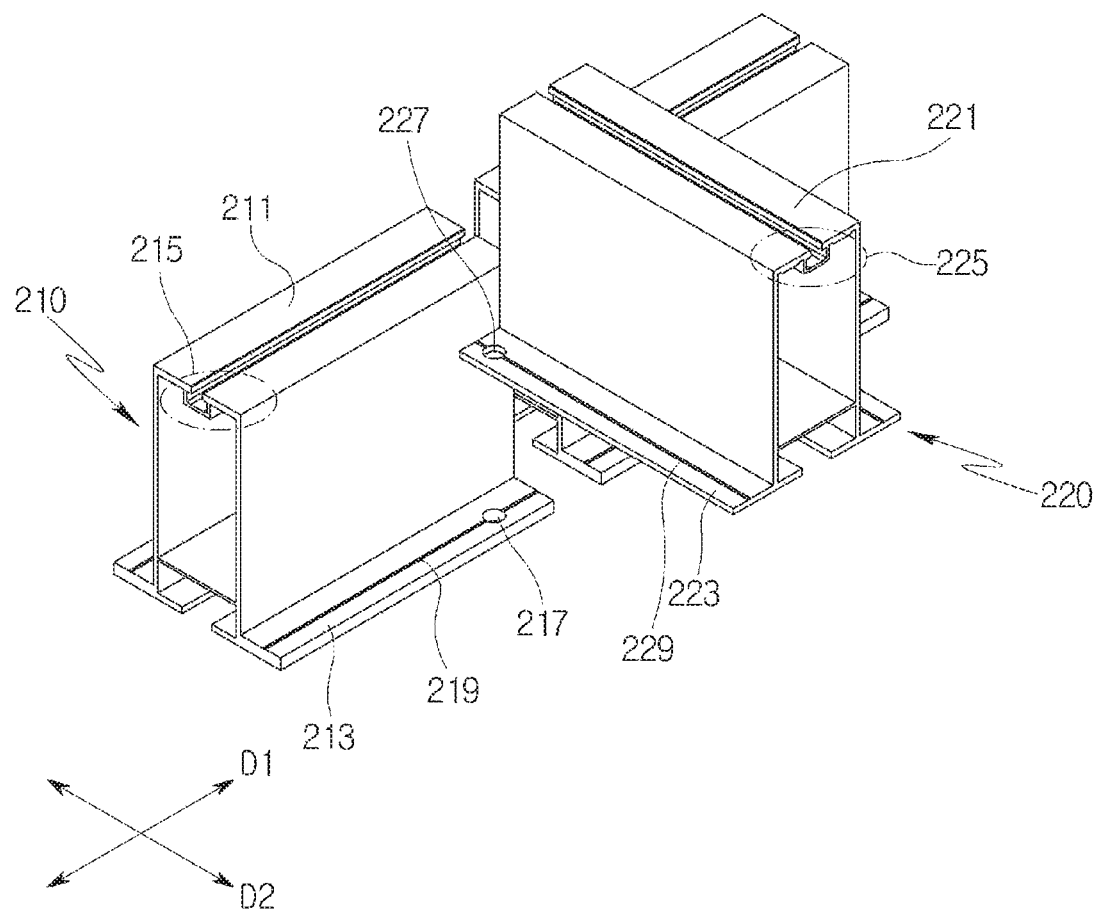
FIG. 2 is a view showing beam elements according to the embodiments of the present disclosure.

FIG. 2 is a view showing beam elements according to the embodiments of the present disclosure. Referring to FIGS. 1 to 2, each of the first beam elements 210 may include a first body portion 211 and a first wing 213, and each of the second beam elements 220 may include a second body portion 221 and a second wing 223.

The first body portion 211 may include a first slide groove 215. In some embodiments, the first slide groove 215 may be formed in an upper surface of the first body portion 211.

The first slide groove 215 may be formed to extend in the extending direction of the first beam element 210. In some embodiments, the first slide groove 215 may have a "T" shape, but is not limited thereto.

The first slide groove 215 may be formed in the upper surface of the first body portion 211. The first slide groove 215 may be formed to extend in the extending direction of the first beam element 210. In some embodiments, the first slide groove 215 may be formed along the center line (e.g., the center line on the first axis) of the upper surface of the first body portion 211, but is not limited thereto.

The first wing 213 may extend from each lower end of the first body portion 211 and support the first body portion 211 at the lower end of the first body portion 211. In some embodiments, the respective first wings 213 may extend oppositely outward from the first body portion 211 along a width direction of the first body portion 211.

Each of the first wings 213 may include a first lower hole 217. The first lower hole 217 may be formed in the first wing 213. In some embodiments, multiple first lower holes 217 may be provided in the first wings 213, and the multiple first lower holes 217 may be symmetrically arranged with respect to the first body portion 211. For example, when two first lower holes 217 are provided in the respective first wings 217, one of the two first lower holes 217 and a remaining one may be arranged symmetrical to each other with respect to the first body portion 211.

Each of the first wings 213 may include a first lower groove 219 formed along the first axis D1 by passing across the first lower hole 217.

The second body portion 221 may include a second slide groove 225. In some embodiments, the second slide groove 225 may be formed in an upper surface of the second body portion 221.

The second slide groove 225 may be formed to extend in the extending direction of the second beam element 220. In some embodiments, the second slide groove 225 may have a "T" shape, but is not limited thereto.

The second slide groove 225 may be formed in the upper surface of the second body portion 221. The second slide groove 225 may be formed to extend in the extending direction of the second beam element 220. In some embodiments, the second slide groove 225 may be formed along the center line (e.g., the center line on the second axis) of the upper surface of the second body portion 221, but is not limited thereto.

The second wing 223 may extend from each lower end of the second body portion 221 and support the second body portion 221 at the lower end of the second body portion 221. In some embodiments, the respective second wings 223 may extend oppositely outward from the second body portion 221 along a width direction of the second body portion 221.

Each of the second wings 223 may include a second lower hole 227. The second lower hole 227 may be formed in the second wing 223. In some embodiments, multiple first lower holes 227 may be provided in the second wings 223, and the multiple first lower holes 227 may be symmetrically arranged with respect to the second body portion 221. For example, when two second lower holes 227 are provided in the respective second wings 223, one of the two second lower holes 227 and a remaining one may be arranged symmetrical to each other with respect to the second body portion 221.

Each of the second wings 223 may include a second lower groove 229 formed along the second axis D2 by passing across the second lower hole 227.

The first beam elements 210 and the second beam elements 220 may be coupled to each other through the lower holes 217 and 227. In some embodiments, the second wings 223 of the second beam elements 220 may be seated on the first wings 213 of the first beam elements 210 with respect to the first lower holes 217 and the second lower holes 227, and beam element connecting members may be coupled to the post 230 by passing through the first lower holes 217 and the second lower holes 227, whereby the first beam elements 210 and the second beam elements 220 may be coupled to each other.

Figure 3:
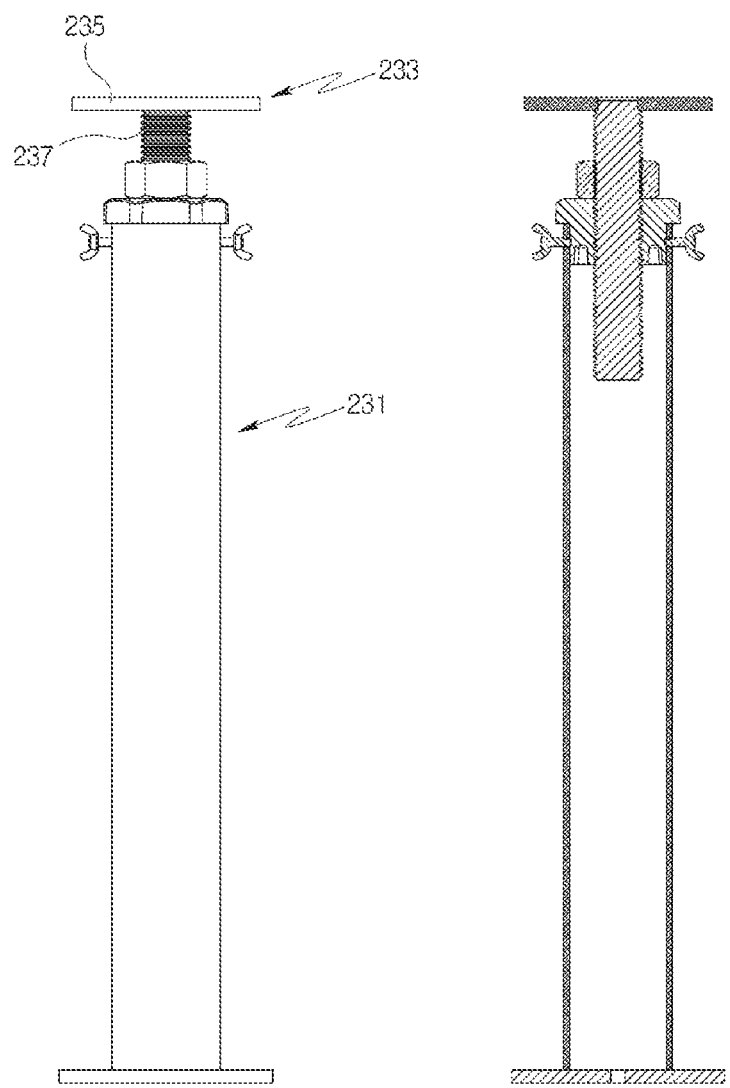
FIG. 3 is a sectional view showing a post according to the embodiments of the present disclosure.

FIG. 3 is a sectional view showing a post according to the embodiments of the present disclosure. Referring to FIGS. 1 to 3, the post 230 may include a post body 231 and a post head 233.

The post body 231 may have a pillar shape capable of supporting the floor panel 100. In some embodiments, the post body 231 may have a cylindrical pillar shape.

The post body 231 may include threads formed on at least a portion of an inner surface thereof. In some embodiments, the threads may be formed on an inner surface of an opening defined within the post body 231. The post body 231 may further include a locking hole formed in an outer surface thereof corresponding to the inner surface on which the threads of the post body are formed.

The post head 233 may include a seat surface 235 for supporting the floor panel, and a post connection portion 237 extending from the seat surface 235 and inserted into the post body 231.

In some embodiments, threads may be formed on the surface of the post connection portion 237. The threads formed at the post connection portion 237 and the threads formed at the post body 231 may be engaged to each other. Through this engagement, the post connection portion 237 may be inserted into the post body 231, and the height of the post 230 may be adjusted as the length of a portion of the post connection portion 237 inserted into the post body 231 is adjusted.

Figure 4:
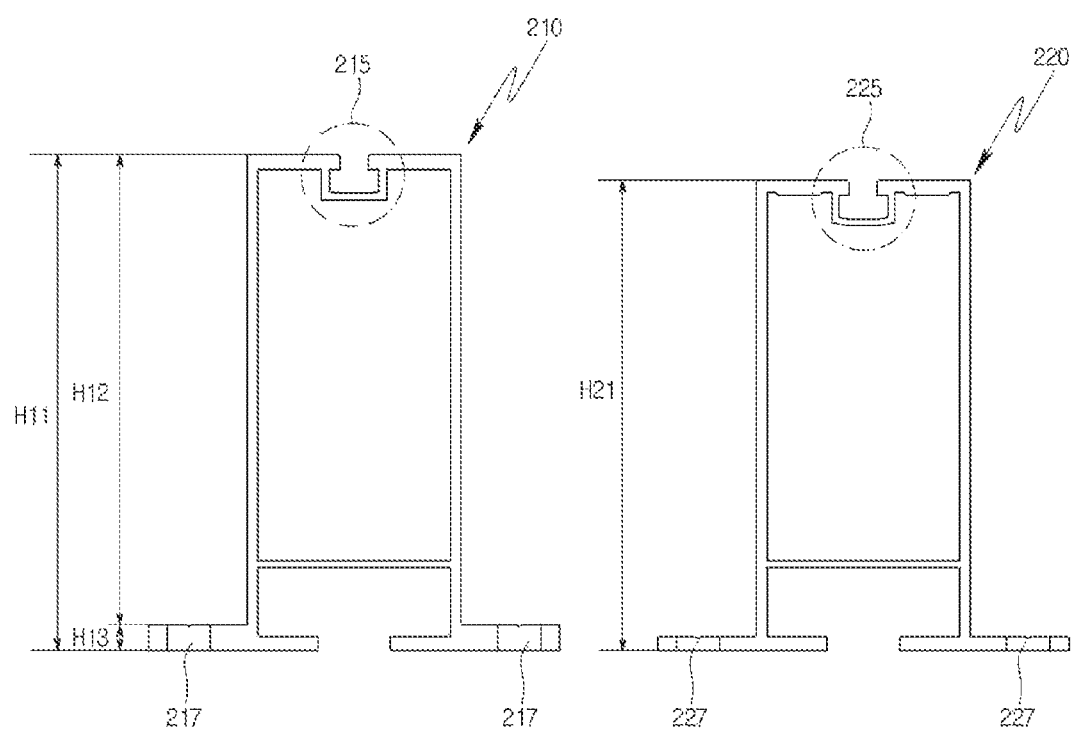
FIG. 4 is a view showing the beam elements according to the embodiments of the present disclosure.

FIG. 4 is a view showing the beam elements according to the embodiments of the present disclosure. Referring to FIGS. 1 to 4, due to the fact that the first beam elements 210 and the second beam elements 220 are coupled to each other, with the second wings 223 of the second beam elements 220 seated on the first wings 213 of the first beam elements 210, each of the first beam elements 210 may have a height H11 greater than a height H21 of each of the second beam elements 220.

In some embodiments, the height H11 of each of the first beam elements 210 may be equal to the sum of a height H12 of the first body portion 211 and a height H13 of each of the first wings 213, and the height H21 of each of the second beam elements 220 may be equal to the height H12 of the first body portion 211 of the first beam element 210. Accordingly, even when the second beam elements 220 are seated on and coupled to the first beam elements 210, the upper surfaces of the first beam elements 210 and the upper surfaces of the second beam elements 220 may be included in the same plane. This therefore has an advantage in that the level of the floor panel 100 is maintained.

Figure 5:
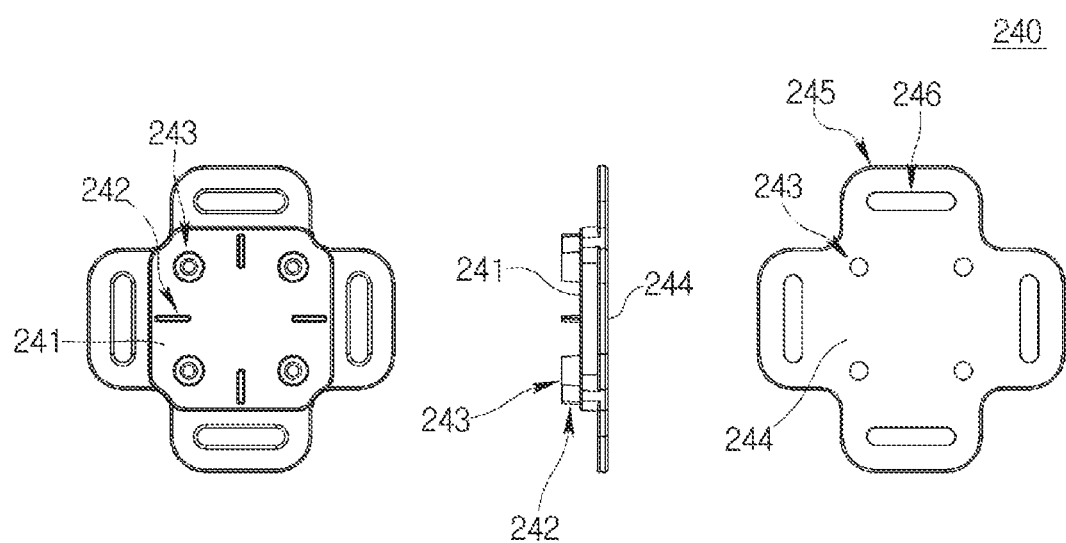
FIG. 5 is a view showing a seat pad according to the embodiments of the present disclosure.

FIG. 5 is a view showing a seat pad according to the embodiments of the present disclosure. FIG. 5 sequentially shows upper, side, and lower surfaces of the seat pad 240. Referring to FIGS. 1 to 5, the seat pad 240 may include a panel installation surface 241 on which the unit panels 110 are installed and a base surface 244 seated on the beam element bracket 250.

In some embodiments, the panel installation surface 241 may refer to the upper surface of the seat pad 240, and the base surface 244 may refer to the lower surface of the seat pad 240. For example, the panel installation surface 241 and the base surface 244 may be parallel to each other.

The panel installation surface 241 and the base surface 244 may have a height difference. That is, the panel installation surface 241 may protrude from the base surface 244 by a predetermined height.

A seat guide 242 and a seat boss 243 may be provided on the panel installation surface 241.

The seat guides 242 may be formed in cross directions on the panel installation surface 241 to divide the panel installation surface 241 into four regions. Herein, each of the unit panels 110 may be seated in each of the four regions of the divided panel installation surface 241.

The seat guides 242 may protrude from the panel installation surface 241 by a predetermined height, and the unit panels 110 of the floor panel 100 may be arranged at flat portions defined between the protruding seat guides 242, whereby movement of the floor panel 100 may be restricted by the seat guides 242.

Seat bosses 243 may be formed at the peripheral edge of the panel installation surface 241. In some embodiments, each of the seat bosses 243 may be formed at a position near each vertex of the panel installation surface 241 and may be formed between each of the seat guides 242. For example, the seat bosses 243 may be arranged in the respective regions of the panel installation surface 241 divided by the seat guides 242. That is, each of the seat bosses 243 may be disposed between two seat guides 242 perpendicular to each other.

The seat bosses 243 may protrude from the panel installation surface 241 by a predetermined height. In some embodiments, the seat bosses 243 and the seat guides 242 may have substantially the same height.

The seat bosses 243 may be inserted into and fixed to the locking holes 111 formed in the unit panels 110. For example, the seat bosses 243 may be smaller in diameter than the locking holes 111. Accordingly, movement of the unit panels 110 may be restricted by the seat bosses 243 inserted into the locking holes 111. Herein, locking pins for securing the locking holes 111 and the seat bosses 243 may be inserted into the locking holes 111 and the seat bosses 243.

Each of the seat bosses 243 may include an opening defined in the center thereof. The openings may pass through the seat bosses 243 and the seat pad 240.

A seat wing 245 and first receiving holes 246 may be formed at the base surface 244 of the seat pad 240.

The seat wing 245 may extend (or protrudes) from the base surface 244. In some embodiments, seat wings 245 may extend from the base surface 244 along the first axis D1 and the second axis D2. When viewing the seat pad 240 on the panel installation surface 241, the seat wings 245 protrude outward from the panel installation surface 241.

In some embodiments, the seat wings 245 may have a height difference with respect to the panel installation surface 241. For example, the seat guides 242 and the seat bosses 243 may be located higher in a vertical direction than the seat wings 245.

The first receiving holes 246 may be formed in the seat wings 245. As will be described later, the seat pad 240 and the beam element bracket 250 may be connected to each other through the first receiving holes 246. In some embodiments, four first receiving holes 246 may be formed in the respective seat wings 245.

Each of the first receiving holes 246 may include an opening having a shape, such as an elliptical shape, which extends longer in one direction than in another direction. In some embodiments, the longitudinal direction of each of the first receiving holes 246 may be defined as a direction in which the opening formed in the first receiving hole 246 has the largest diameter, and the longitudinal directions of the first receiving holes 246 may be perpendicular to the extending directions of the beam elements 210 and 220 where the first receiving holes 246 are located. For example, the longitudinal directions of the first receiving holes 246 located on the first beam elements 210 may be perpendicular to the direction of the first axis D1. When the four first receiving holes 246 are formed in the respective seat wings 245, two first receiving holes may be arranged along the first axis D1 in the seat wings 245 oppositely extending along the first axis, and the two remaining first receiving holes may be arranged along the second axis D2 in the seat wings 245 oppositely extending along the second axis.

As will be described later, the seat pad 240 according to the embodiments of the present disclosure may be seated on the beam elements 210 and 220 through the first receiving holes 246 formed in the upper surfaces of the seat wings 245, thus being movable horizontally on the beam elements 210 and 220.

Figure 6:
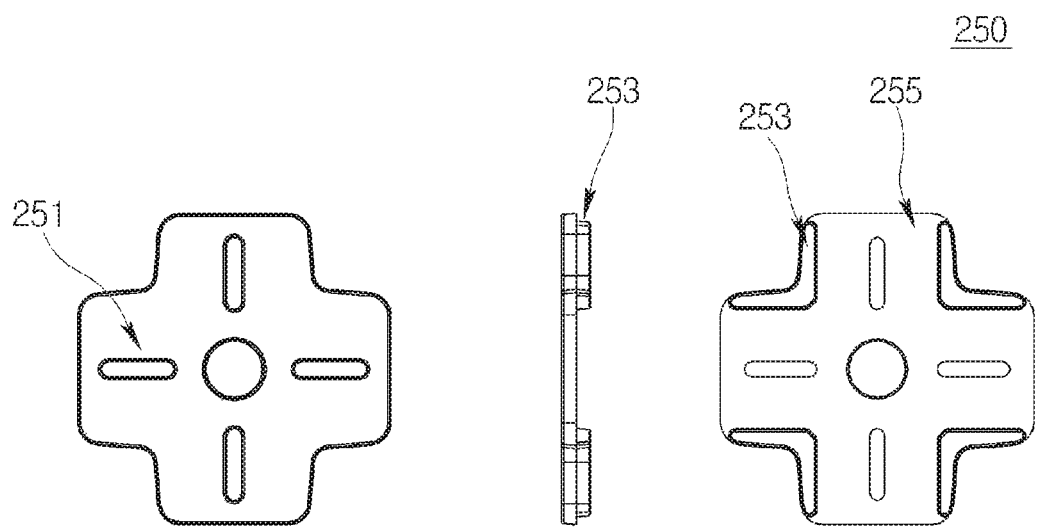
FIG. 6 is a view showing a beam element bracket according to the embodiments of the present disclosure.

FIG. 6 is a view showing a beam element bracket according to the embodiments of the present disclosure. FIG. 6 sequentially shows upper, side, and lower surfaces of the beam element bracket 250. Referring to FIGS. 1 to 6, the beam element bracket 250 may include multiple second receiving holes 251 and a seat portion 253.

As will be described later, the second receiving holes 251 may be used to couple the seat pad 240 and the beam element bracket 250 to each other. In some embodiments, four second receiving holes 251 may be provided.

Each of the second receiving holes 251 may include an opening having a shape, such as an elliptical shape, which extends longer in one direction than in another direction. In some embodiments, the longitudinal direction of each of the second receiving holes 251 may be defined as a direction in which the opening formed in the second receiving hole 251 has the largest diameter, and the longitudinal directions of the second receiving holes 251 may be parallel to the extending directions of the beam elements 210 and 220 where the second receiving holes 251 are located. For example, the longitudinal directions of the second receiving holes 251 located on the first beam elements 210 may be parallel to the direction of the first axis D1 of the first beam elements 210. Accordingly, the longitudinal directions of the first receiving holes 246 and the longitudinal directions of the second receiving holes 251 may be perpendicular to each other.

In some embodiments, when the four second receiving holes 251 are formed, two second receiving holes may be arranged along the first axis D1, and the two remaining second receiving holes may be arranged along the second axis D2.

The seat pad 240 and the beam element bracket 250 may be coupled to each other through the first receiving holes 246 of the seat pad 240 and the second receiving holes 251 of the beam element bracket 250.

The seat portion 253 may extend in the vertical direction from the lower surface of the beam element bracket 250. In some embodiments, seat portions 253 may extend downward by a predetermined height in the vertical direction of the lower surface of the beam element bracket 250 along the peripheral edge of the lower surface.

A seat groove 255 may be formed between each of the seat portions 253, and the body portions 211 and 221 of the beam elements 210 and 220 may be coupled to the respective seat grooves 255. That is, the seat portions 253 can prevent the beam element bracket 250 from being separated from the beam elements 210 and 220 after the beam element bracket 250 is seated on the beam elements 210 and 220. Accordingly, the beam elements 210 and 220 may be inserted into and fixed to the seat grooves 255.

Figure 7:
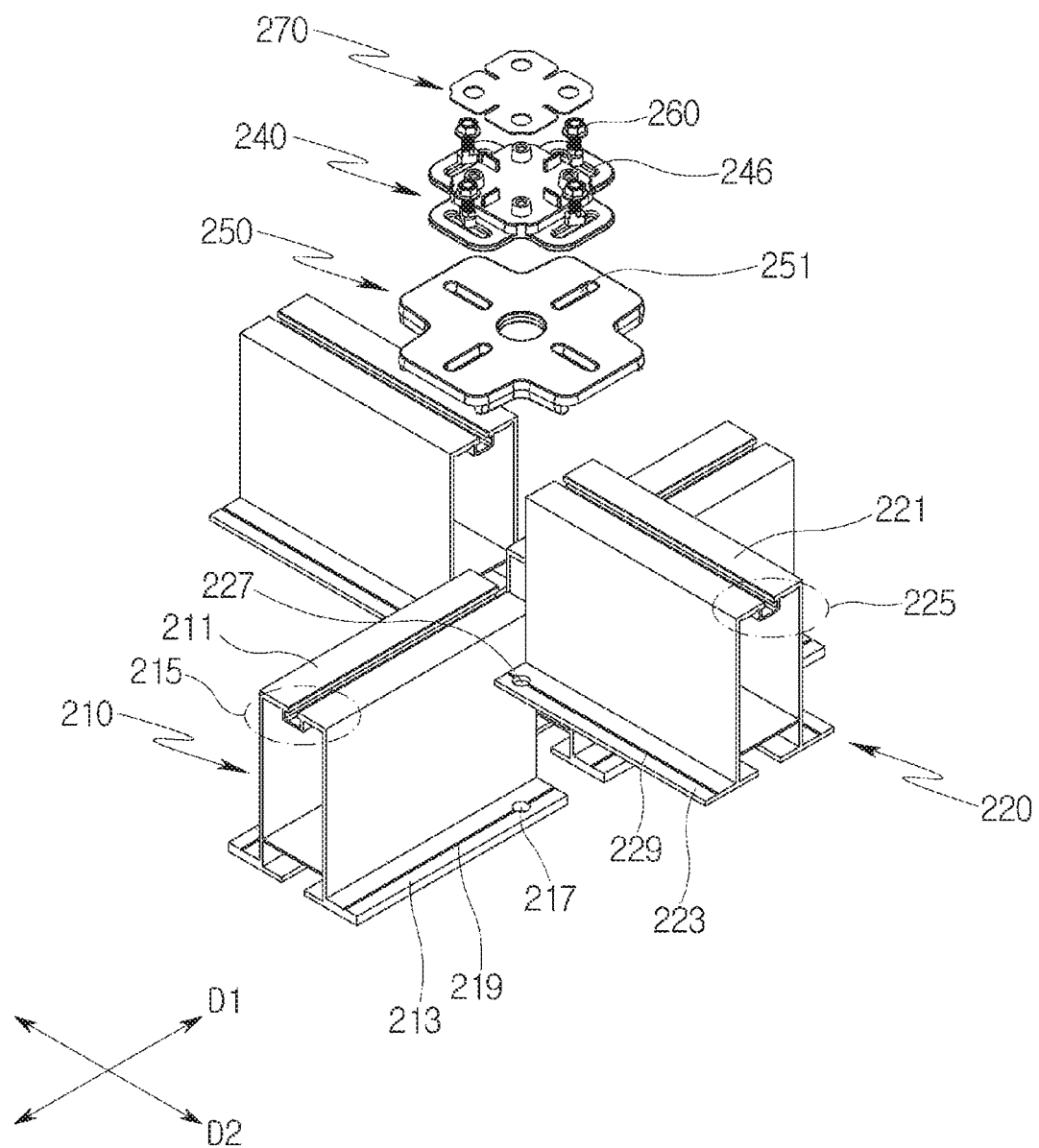
FIG. 7 is a view showing a process of assembling the beam elements, the seat pad, and the beam element bracket according to the embodiments of the present disclosure.

FIG. 7 is a view showing a process of assembling the beam elements, the seat pad, and the beam element bracket according to the embodiments of the present disclosure. Referring to FIGS. 1 to 7, the second wings 223 of the second beam elements 220 are seated on the first wings 213 of the first beam elements 210. Herein, the second wings 223 are seated on the first wings 213 such that the first lower holes 217 and the second lower holes 227 are aligned. Then, beam element coupling bolts are passed through the first lower holes 217 and the second lower holes 227 to couple the first wings 213 and the second wings 223 to each other. When the first wings 213 and the second wings 223 are coupled to each other, the heights of the upper surfaces of the first beam elements 210 and the second beam elements 220 become the same.

Then, the beam element bracket 250 is seated on the upper surfaces of the first beam elements 210 and the second beam elements 220. Herein, the beam element bracket 250 is seated by aligning the body portions 211 and 221 to be inserted into the seat grooves 255 formed between the seat portions 253 of the beam element bracket 250.

Then, the seat pad 240 is seated on the beam element bracket 250. In some embodiments, the seat pad 240 may be seated such that the first receiving holes 246 correspond one to one to the second receiving holes 251. For example, the seat pad 240 may be seated on the beam element bracket 250 such that each of the first receiving holes 246 and each of the second receiving holes 251 partially overlap each other. Herein, as described above, the longitudinal directions of the first receiving holes 246 (i.e., the directions having the longest length) and the longitudinal directions of the second receiving holes 251 corresponding thereto may be perpendicular to each other.

Then, the seat pad 240 and the beam element bracket 250 may be fixed to the beam elements 210 and 220 through seat pad connection members 260. The seat pad connection members 260 may be fixed to the beam elements 210 and 220 by being passed through the seat pad 240 and the beam element bracket 250. In some embodiments, the seat pad connection members 260 may be passed through the first receiving holes 246 and the second receiving holes 251 and be inserted into the slide grooves 215 and 225.

Through the seat pad connection members 260 that are passed through the first receiving holes 246 of the seat pad 240 and the second receiving holes 251 of the beam element bracket 250, the seat pad 240 may be mounted on the beam element bracket 250.

Each of the seat pad connection members 260 may be a T-bolt having a T-shaped head. In some embodiments, the length (i.e., the largest diameter) of the T-shaped head of the seat pad connection member 260 may be equal to or less than the diameter of each of the first receiving holes 246 and the diameter of each of the second receiving holes 251, but is not limited thereto.

A reinforcement pad 270 may be disposed on the seat pad 240. In some embodiments, the reinforcement pad 270 may be disposed on the panel installation surface 241 to receive the seat guides 242 and the seat bosses 243 of the seat pad 240. For example, openings having shapes conforming to the seat guides 242 and the seat bosses 243 of the seat pad 240 may be formed on the reinforcement pad 270, and the seat guides 242 and the seat bosses 343 may be inserted into the openings whereby the reinforcement pad 270 may be disposed on the panel installation surface 241.

The reinforcement pad 270 can reinforce a supporting force of the seat pad 240, increase friction between the seat pad 240 and the unit panels 110, and prevent wear and breakage of the seat pad 240. In some embodiments, the reinforcement pad 270 may include an elastic material such as rubber or silicon, but is not limited thereto.

Figure 8:
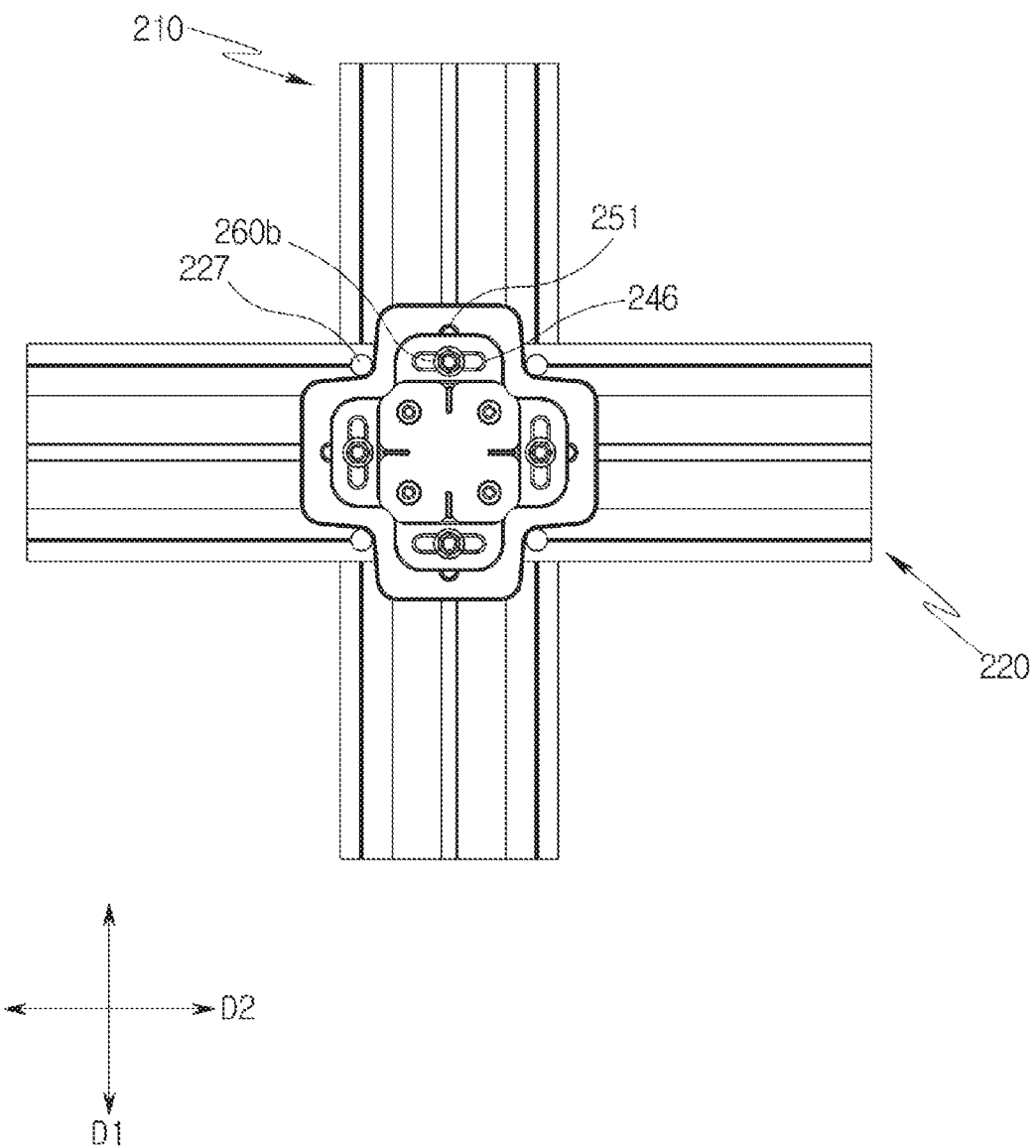
FIGS. 8 to 10 are views showing movement of the seat pad according to the embodiments of the present disclosure.
Figure 9:
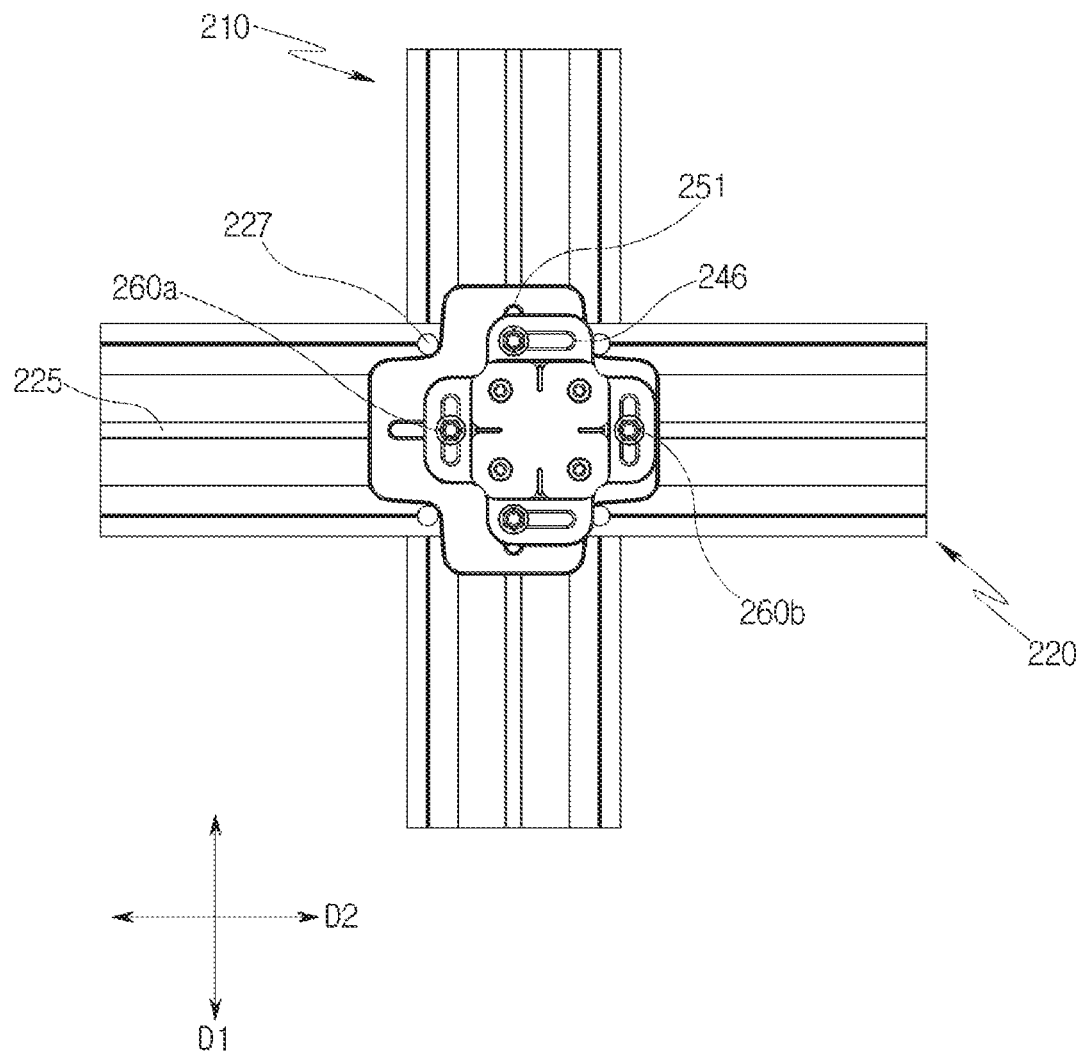
Figure 10:
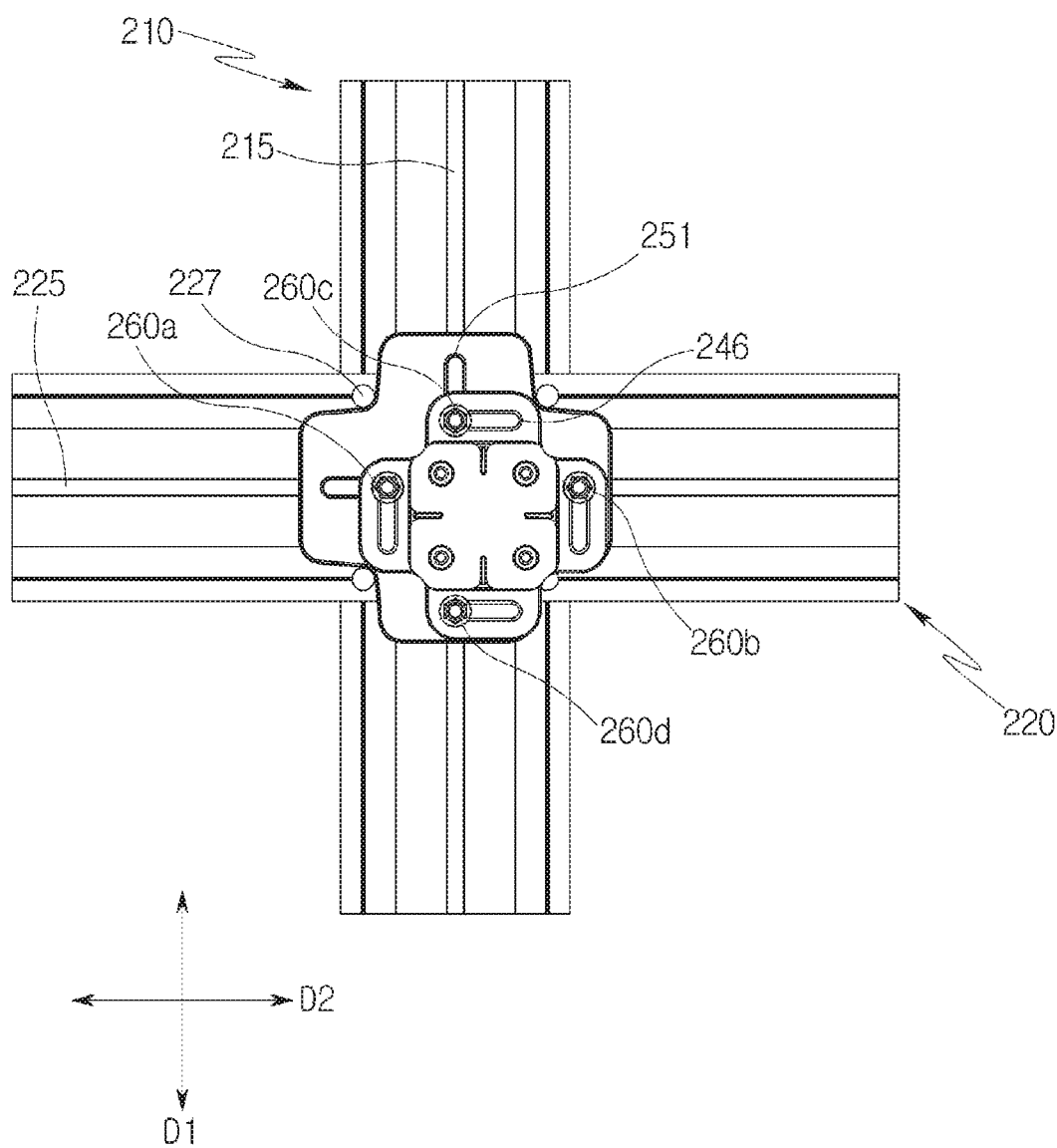

FIGS. 8 to 10 are views showing movement of the seat pad according to the embodiments of the present disclosure. Referring to FIGS. 9 to 10, the seat pad connection members 260 may be received in the first receiving holes 246 and the second receiving holes 251. Although not shown in FIGS. 8 to 10, it is assumed that the seat pad connection members 260 are in a state of being inserted into the slide grooves 215 and 225 and fastened to the beam elements 210 and 220.

As will be described later in detail, the seat pad connection members 260 may be received in the first receiving holes 246 and the second receiving holes 251, and the relative position between the seat pad connection members 260 and the first and second receiving holes 246 and 251 may vary within a range that is defined by the length of the openings formed in the first and second receiving holes 246 and 251. Thus, even after the seat pad connection members 260 are passed through the seat pad 240 and the beam element bracket 250 and coupled to the beam elements 210 and 220, the seat pad connection members 260 are movable back and forth and side to side within the range that is defined by the length of the openings formed in the first and second receiving holes 246 and 251. This therefore ensures that a horizontal position of the seat pad 240 on the beam element bracket 250 is controlled.

Referring to FIG. 8, a position of the seat pad 240 when the seat pad connection members 260 are received in central portions of the first receiving holes 246 and central portions of the second receiving holes 251 may be referred to as a reference position. For example, at the reference position, an intersecting point of the beam elements 210 and 220 and a central point of the seat pad 240 may coincide with each other. The seat pad 240 according to the embodiments of the present disclosure is movable back and forth and side to side from the reference position shown in FIG. 8.

Referring to FIG. 9, the beam element bracket 250 is seated on and fixed to the beam elements 210 and 220. Seat pad connection members 260a and 260b coupled into the second beam elements 220 may be moved on the fixed beam element bracket 250 along the second slide grooves 225 along the second axis D2. Accordingly, the seat pad connection members 260a and 260b may be moved along the second axis D2 within the range that is defined by the length of the openings of the second receiving holes 251. The seat pad 240 may be moved on the beam element bracket 250 along the second axis D2 in conjunction with the movement of the seat pad connection members 260a and 260b. That is, the central point of the seat pad 240 may be partially moved along the second axis D2 from a central point of the beam element bracket 250.

Referring to FIG. 10, the seat pad connection members 260c and 260d coupled into the first beam elements 210 may be moved on the fixed beam element bracket 250 along the first slide grooves 215 along the first axis D1. Accordingly, the seat pad connection members 260c and 260d may be moved along the first axis D1 within the range that is defined by the length of the openings of the second receiving holes 251. The seat pad 240 may be moved on the beam element bracket 250 along the first axis D1 in conjunction with the movement of the seat pad connection members 260c and 260d. That is, the central point of the seat pad 240 may be partially moved along the first axis D1 from the central point of the beam element bracket 250.

Due to the fact that the support structure 200 according to the embodiments of the present disclosure includes the seat pad 240 for supporting the floor panel 100, there is an advantage in that the floor panel 100 can be more stably seated on the support structure 200.

According to the embodiments of the present disclosure, due to the fact that the seat pad 240 is coupled to the beam elements 210 and 220 through the seat pad connection members 260 that are movable on the beam elements 210 and 220, there is an advantage in that the seat pad 240 can be seated on the beam elements 210 and 220 by being moved back and forth and side to side. Accordingly, even when the center of the seat pad 240 is not located at the intersecting point of the unit panels 110 due to installation accumulated tolerances or other construction reasons, this can be solved by easily moving the position of the seat pad 240.

Furthermore, according to the embodiments of the present disclosure, due to the fact that the seat pad 240 and the beam elements 210 and 220 are coupled to each other using the seat pad connection members 260 without requiring provision of any separate structure, there is an advantage in that the seat pad 240 is easy to seat on the beam elements 210 and 220, thus simplifying a manufacturing process.

Furthermore, according to the embodiments of the present disclosure, due to the fact that the seat pad connection members 260 are engaged into the slide grooves 215 and 225 formed in the beam elements 210 and 220, there is an advantage in that the seat pad 240 is easy to mount without requiring provision of separate threads formed on the beam elements 210 and 220, thus simplifying a manufacturing process.

Although the exemplary embodiments of the present disclosure have been described for illustrative purposes, those skilled in the art will appreciate that various modifications, additions and substitutions are possible, without departing from the scope and spirit of the invention as disclosed in the accompanying claims. Accordingly, it should be understood that the present disclosure includes various modifications, additions and substitutions without departing from the scope and spirit of the invention as disclosed in the accompanying claims.

What is claimed is:

1. A support structure on which a floor panel is seated, the support structure comprising:
    a beam element disposed along an axis;
    a post supporting the beam element;
    a beam element bracket seated on top of the beam element;
    a seat pad seated on top of the beam element bracket, and supporting the floor panel; and
    a seat pad connection member connecting the beam element bracket and the seat pad to each other.

2. The support structure of claim 1, wherein the beam element includes a first beam element and a second beam element disposed perpendicular to each other,
    the first beam element includes a first body portion, and a first wing protruding outward from the first body portion,
    the second beam element includes a second body portion, and a second wing protruding outward from the second body portion, and
    any one of the first wing and the second wing is seated on a remaining one of the first wing and the second wing.

3. The support structure of claim 2, wherein the first wing includes a first lower hole,
    the second wing includes a second lower hole, and
    the first wing and the second wing are connected to each other through a beam element connecting member inserted into the first lower hole and the second lower hole.

4. The support structure of claim 1, wherein the seat pad includes:
    a panel installation surface on which the floor panel is installed; and
    a base surface parallel to the panel installation surface and seated on the beam element bracket, wherein
    a seat guide for preventing separation of the floor panel is formed on the panel installation surface.

5. The support structure of claim 4, wherein the seat guide protrudes from the panel installation surface by a predetermined height.

6. The support structure of claim 4, wherein the base surface includes:
    a seat wing protruding from the base surface; and
    a first receiving hole formed in the seat wing.

7. The support structure of claim 6, wherein the seat pad connection member is coupled to the beam element through the first receiving hole to connect the seat pad, the beam element bracket, and the beam element to each other.

8. The support structure of claim 6, wherein the beam element bracket includes a second receiving hole configured such that at least a portion thereof overlaps with the first receiving hole.

9. The support structure of claim 8, wherein the seat pad connection member is received in the first and second receiving holes to be movable within the first and receiving holes.

10. The support structure of claim 8, wherein a longitudinal direction of the second receiving hole is parallel to a longitudinal direction of the beam element.

11. The support structure of claim 8, wherein a longitudinal direction of the first receiving hole and the longitudinal direction of the second receiving hole are perpendicular to each other.

12. The support structure of claim 8, wherein the beam element includes a slide groove formed in an upper surface of the beam element and receiving the seat pad connection member, and
    the seat pad is inserted into and fixed to the slide groove by passing through the first and second receiving holes.

13. An access floor system, comprising:
    a floor panel; and
    a support structure supporting the floor panel,
    wherein the support structure includes:
    a beam element disposed along an axis;
    a post supporting the beam element;
    a beam element bracket seated on top of the beam element;
    a seat pad seated on top of the beam element bracket, and supporting the floor panel; and
    a seat pad connection member connecting the beam element bracket and the seat pad to each other.

14. The support structure of claim 13, wherein the seat pad includes:
    a panel installation surface on which the floor panel is installed; and
    a base surface parallel to the panel installation surface and seated on the beam element bracket, wherein
    a seat guide for preventing separation of the floor panel is formed on the panel installation surface.

15. The support structure of claim 14, wherein the base surface includes:
    a seat wing protruding from the base surface; and
    a first receiving hole formed in the seat wing.

16. The support structure of claim 15, wherein the seat pad connection member is coupled to the beam element through the first receiving hole to connect the seat pad, the beam element bracket, and the beam element to each other.

* * * * *